United States Patent [19]

Mahlmann

[11] 3,979,528
[45] Sept. 7, 1976

[54] PRESSURE FIXATION OF COFFEE GRINDER GAS

[75] Inventor: James P. Mahlmann, Wayne, N.J.

[73] Assignee: General Foods Corporation, White Plains, N.Y.

[22] Filed: May 20, 1974

[21] Appl. No.: 471,630

[52] U.S. Cl. .............................. 426/594; 426/386; 426/651
[51] Int. Cl.² .......................................... A23F 1/04
[58] Field of Search ........... 426/386, 387, 594, 312, 426/534, 651, 594, 388, 477, 524

[56] References Cited
UNITED STATES PATENTS

| | | | |
|---|---|---|---|
| 2,680,687 | 6/1950 | Lemmonier | 426/386 X |
| 3,021,218 | 2/1962 | Clinton et al. | 426/386 |
| 3,535,118 | 10/1970 | Klein et al. | 426/386 |
| 3,783,163 | 1/1974 | Patel | 426/386 X |
| 3,823,241 | 7/1974 | Patel et al. | 426/386 |
| 3,836,682 | 9/1974 | Yadlowsky | 426/386 |

OTHER PUBLICATIONS

"Coffee Processing Technology" by Sivetz, vol. 2 pub. 1963 by Avi Pub. Co., Westport, Conn., pp. 34–35.

*Primary Examiner*—Frank W. Lutter
*Assistant Examiner*—N. Greenblum
*Attorney, Agent, or Firm*—Thomas R. Savoie; Bruno P. Struzzi; Daniel J. Donovan

[57] ABSTRACT

The concentration of volatile organics that can be incorporated into a glyceride carrier is increased by the use of pressure in excess of 100 psia. Specifically coffee grinder gas aromatics are contacted with coffee oil in a pressure vessel. The resulting aromatized oil is then combined with soluble coffee solids.

3 Claims, No Drawings

PRESSURE FIXATION OF COFFEE GRINDER GAS

BACKGROUND OF THE INVENTION

This invention is related to commonly-assigned U.S. patent application Ser. No. 371,784 filed June 20, 1973 entitled "Method for Aromatizing Soluble Coffee" wherein is disclosed a method for condensing the aromatic gases given off during the comminution of freshly roasted coffee in a vertically-mounted, scraped-wall heat exchanger which is cooled by means of liquid nitrogen. The condensed gases are collected at the bottom of the heat exchanger in the form of a frost or snow and this frost is mixed with a liquid glyceride and then combined with a coffee extract prior to drying the extract (e.g. freeze drying) or combined with a soluble coffee powder. This application is hereby incorporated by reference.

Grinder gas, that is the gas which is released from roasted whole coffee beans when their internal cell structure is disrupted, such as during grinding of the beans and which also continues to be evolved from the disrupted and/or fractured bean for a short period thereafter, has long been recognized in the art as a highly desirable natural coffee aroma. The collection and stabilization of this aroma has however proven to be a difficult undertaking, especially when it is desired for use in a commercial-sized soluble coffee system.

The use of grinder gas as a means to enhance the jar aroma of a soluble coffee powder is disclosed in U.S. Pat. No. 3,021,218 to Clinton et al. which aromatizes the jar headspace and U.S. Pat. No. 2,306,061 to Johnston which condenses grinder gas aromatics onto chilled soluble coffee powder. The use of grinder gas condensates which are added to a liquid extract and dried in order to produce an improved cup aroma when the powder is dissolved in hot water is disclosed in U.S. Pat. No. 3,244,533 to Clinton et al. which homogenizes coffee oil in extract and then adds condensed grinder gas aromatics. Co-pending, commonly-assigned patent application Ser. No. 252,883, filed May 12, 1972, now U.S. Pat. No. 3,821,447 discloses mixing condensed grinder gas frost with a liquid glyceride which mixture is then processed to remove excess water, such as by centrifugation, prior to being combined with soluble coffee solids (e.g. soluble powder).

SUMMARY OF THE INVENTION

This invention is directed to fixing in a glyceride carrier aromatics contained in an aroma-bearing gas which has a high (e.g. above 80% by weight) carbon dioxide content, and which has been condensed as an aroma-bearing frost. This invention will be particularly described in terms of coffee grinder gas which contains in excess of 90% $CO_2$ by weight; however, it is to be understood that other aroma-bearing gases, such as percolator vent gas and roaster gas, may likewise be employed.

The addition of the condensed aromatics to a glyceride carrier is a known method for attempting to stabilizing the aromatics. Such glycerides as coffee oil, bland-tasting vegetable oils and triacetin have proven especially useful for this purpose; however other oils and low melting point fats may also be used. It has, however, been desired to maximize the amount of aromatics that are fixed in the glyceride carrier, since this would minimize aroma loss and would reduce the amount of the glyceride which would be incorporated with the soluble coffee product to obtain a desired amount of aromatization.

The process of this invention utilizes the principal of high pressure fixation to increase absorption of the volatile compounds present in an aroma-bearing carbon dioxide frost by a glyceride carrier. The process, which may be conducted as a simple batch operation in a suitable pressure vessel, or as a semi-continuous, countercurrent operation in a battery of pressure vessels, eliminates the need for laborious mixing of the frost and the glyceride. This mixing operation has proven to be troublesome in commercial operation, since contact between the condensed frost and the glyceride quickly congeals the glyceride thus making uniform mixing of the two components quite difficult. If the mixture is allowed to warm to a point where the glyceride exists as a liquid, many of the desirable, condensed grinder gas aromatics will escape to the atmosphere.

According to this invention the aroma-bearing, carbon dioxide frost, which may be obtained from a liquid nitrogen-cooled scraped-surface heat exchanger, is contacted in a pressure vessel with a liquid glyceride phase at a ratio of grams of frost to grams of glyceride of about 0.5:1 to 6:1. The vessel is isolated from the atmosphere and the vessel contents are continuously suppled with heat by such means as a water jacket. Heat is supplied in sufficient quantities to raise or maintain the temperature of the glyceride above its congeal point, preferably the contents of the pressure vessel will reach at least room temperature. As the temperature of the frost increases, a gaseous phase of increasing pressure is developed and as the temperature increases above about −69.9°F the remaining condensed carbon dioxide is converted from a solid phase to a liquid phase. When the temperature of the vessel contents is above the congeal point of the glyceride, aromatics are readily dissolved in the liquid glyceride phase. It may be desirable to hold the vessel contents at a particular temperature above the congeal point of the glyceride in order to lengthen by an hour or more the contact time between the liquid glyceride and the aromatics. Agitation of the vessel contents, such as by means of an internal stirrer, may also be desirable in order to increase absorption of aromatics by the liquid glyceride.

After the contents of the vessel reach the desired temperature, preferably about room temperature, and possibly after a hold-up period the aromatized glyceride is removed from the vessel. The resulting glyceride is found to contain more than twice the amount of aromatics obtained from manual mixing of the two components at atmospheric pressure. The aromatized glyceride should then be processed to remove excess water such as by centrifugation, as described in aforementioned Ser. No. 252,883.

The aromatized glyceride may be combined with coffee solids either in the form of dry soluble coffee, such as by conventional spray plating or any of the techniques disclosed in U.S. Pat. No. 3,769,032, or with a liquid coffee or coffee-like extract, prior to drying the extract. The aromatized glyceride may be solidified, such as by freezing, and comminuted, such as by grinding, prior to being mixed with the soluble coffee powder, such as disclosed in copending commonly-assigned patent application Ser. No. 252,757, filed May 12, 1972 or prior to being combined with a liquid coffee extract, such as disclosed in now abandoned commonly-assigned patent application Ser. No. 252,778, filed May 12, 1972, a slushed coffee extract, such as disclosed in commonly-assigned U.S. Pat. No. 3,809,770, or a partially frozen slab of coffee extract, such as disclosed in commonly-assigned U.S. Pat. No. 3,809,766.

All of the aforementioned patents and commonly-assigned patent applications are hereby incorporated by reference.

DESCRIPTION OF THE INVENTION

The most readily available source of grinder gas may be obtained by enclosing or hooding coffee grinding equipment, such as the commercial Gump grinders. The gases liberated from the ground coffee may be removed by a pump or rotary blower; additionally, when desired, a stream of inert, preferably moisture free, gas may be used to sweep gas from the coffee and to have the grinding operation take place in a substantially inert atmosphere. Such a process is described in U.S. Pat. No. 2,156,212 which describes a method of collecting gases evolved during roasting, but which can be equally applied to the collection of gases evolved during the grinding or cellular disruption of whole freshly roasted coffee beans. If pumping is employed it may be desirable to cool the gas ahead of the pump so that the heat added by pumping will not deteriorate the aromatics contained in the gas.

The chemical composition of the evolved gas is largely carbon dioxide together with water vapor and the characteristic aromatic constituents of roasted coffee. The amount of moisture in the gas may be lowered by the use of dry roasting conditions and low-moisture or non-aqueous quenching mediums, such as cold, liquid or solid gases or liquid freons. The evolved gas is preferably passed through a first condenser where it is cooled to between 35° and 50°F and where substantial quantities of water are removed. The relatively low-moisture gas is then fed to a condenser, such as a jacketed, vertically-mounted, scraped-wall heat exchanger, which is cooled by means of a liquid gas refrigerant.

Preferably the condenser is cooled by means of liquid nitrogen and the gas flow into the exchanger is maintained within the range of about 1 to 5 cubic feet per minute per square foot of heat exchange surface. The nitrogen gas that evolves from the cooling system is useful as an inert gas stream which might be used elsewhere in the soluble coffee process, such as sweeping grinder gas from the grinder or inert gas packaging of the soluble coffee product.

The aroma bearing gas is condensed into the form of a frost as it comes into contact with the heat transfer wall of the condenser. The frost is removed from the condenser wall and collected for combination with a glyceride carrier. The frost may be held for a short period at low, such as liquid nitrogen, temperatures without deteriorating; however, it is preferred to immediately combine the frost with a glyceride carrier in accordance with this invention. The glyceride, which preferably is coffee oil or a bland-tasting vegetable oil, such as cottonseed, corn or coconut oil, is combined with the frost at a level of about 0.5 to 6 grams of frost per gram of glyceride, preferably at about 1 to 4 grams of frost per gram of glyceride.

According to this invention contact between the grinder gas frost and the glyceride occurs under pressure and in a pressure vessel. Conditions and operating procedures useful for effecting the pressurized contact between the grinder gas and the glyceride are set forth below, reference being made to three concurrently-filed, commonly-assigned patent applications which are hereby incorporated by reference. The frost and the glyceride may be placed in the vessel before the initial isolation of the vessel. Alternatively, the glyceride may be added to the vessel subsequent to the frost and after the vessel has reached a desired temperature and/or pressure.

A. As set forth in U.S. patent application Ser. No. 471,631, the frost is placed in the vessel and the temperature within the pressure vessel is raised above the congeal point of the glyceride and below about 85°F. The glyceride may be added either with the frost or after the frost has been warmed, preferably to above the glyceride congeal point. Then, possibly after a liquid glyceride phase-grinder gas contact period of up to several hours, the pressure is slowly released, preferably in such a manner that the glyceride is maintained in a liquid state. Most preferably the temperature is raised to about room temperature and the pressure is released from the vessel isothermally. Pressure release may be conducted through a small diameter tube of sufficient length to preclude a rapid drop of pressure or temperature within the vessel. According to this co-pending application, it may also be desirable to regulate the amount of grinder gas frost which is placed into the vessel to a level where a saturated gas phase is present without the existence of a liquid gas phase.

B. As set forth in U.S. patent application Ser. No. 471,633, with the frost and glyceride present, the temperature within the vessel is raised or maintained above 87.8°F, the critical temperature of liquid $CO_2$, and the pressure is then, possibly after a hold-up period, slowly, preferably isothermally, released without the formation of liquid $CO_2$.

C. After the frost is placed in the vessel, the vessel is isolated and the contents are allowed to warm to a point where a pressure of about 100 psig. (about −55°F, based on pure $CO_2$) is developed. Liquid $CO_2$ is then permitted to evaporate by venting the vessel and controlling pressure at about 100 psig. Once a substantial portion of the $CO_2$ is removed, the vessel is again isolated and the contents warmed to above the congeal point of the glyceride, preferably about room temperature. An end pressure of 200 to 500 psig. should be obtained. Then with the glyceride present and preferably after a hold-up period, this pressure is slowly released.

D. After the frost is placed in the vessel, the vessel is isolated and supplied with heat (e.g. 70°–75°F water bath). The pressure is allowed to reach to between 75 and 120 psig., then the vessel is rapidly vented to 0 psig. The vessel is repeatedly isolated, pressurized and vented until the residual pressure build-up is less than 100 psig. at which point the vessel is allowed to warm to about room temperature. Thereafter, with the glyceride present, the vessel is completely vented. This process seeks to minimize the amount of volatiles which escape from the vessel with the $CO_2$ when pressure is relieved. During rapid venting heat must be supplied to expand the gas, and this heat will be furnished almost entirely adiabatically with the result that the remaining grinder gas frost, the volatiles contained therein and the glyceride that may be present are cooled. The repeated ventings seek to remove $CO_2$, leaving a concentrated level of volatiles to dissolve or be dissolved in the glyceride.

E. After the frost is placed in the vessel, the vessel is isolated and supplied with heat. The temperature of the vessel contents is permitted to rise above the congeal point of the glyceride; however before room temperature is reached, and with the glyceride present in the vessel, pressure is quickly released. As a result of the rapid pressure release, the material remaining is a frozen, aroma-containing glyceride with additional grinder gas aromatics condensed onto its surface.

F. The frost is placed in a vessel and $CO_2$ is sublimed at atmospheric pressure (about $-110°F$). After a substantial portion of $CO_2$ is removed, the vessel is isolated and the contents raised to about room temperature and, with the glyceride present, the vessel is then vented. A 100 to 200 psig. pressure should be achieved prior to venting.

G. The grinder gas frost is sealed in a pressure vessel and the pressure is allowed to rise to about 100 psig. The pressure is then rapidly reduced to 0 psig. and this cycle is repeated two to three more times. The vessel is then sealed and the contents heated to an internal temperature of about 70°F. Then with the glyceride present, and possibly after a hold-up period, the vessel is vented. As an improvement of this process, it may be desirable to pass the sublimed frost gases through a column of liquid or liquified glyceride, which glyceride is then placed in the vessel.

H. Place both the grinder gas frost and the glyceride in the vessel. Seal the vessel and warm the contents up to about room temperature. Thereafter, cool to below 30°F and, if desired, to as low as $-100°F$, then vent off residual $CO_2$ pressure. The aromatized glyceride may be removed and used as a solid or else warmed and removed as a liquid.

As a preferred embodiment of this invention, the vented or sublimed gas which may contain desirable aromatics is processed or handled in order to reclaim or recycle aromatics. Refluxing the vented or sublimed gas by means of an overhead packed column and partial condenser, such as described in concurrently-filed, commonly-assigned U.S. patent application Ser. No. 471,632, is possible. Venting the pressure vessel directly to the scraped-wall heat exchanger, to a bed of dry ice, or to another batch of liquid glyceride and/or grinder gas frost may also be desirable.

After the pressure within the vessel is released and/or reduced, the aromatized glyceride is removed from the vessel. This can be done by decanting or by draining the liquid through a valve in the bottom of the vessel. It would also be possible to permit residual pressure within the vessel to force the liquid out of a vertical withdrawal tube which protrudes through the upper portion of the vessel. If the glyceride is removed from a pressurized vessel, any residual gas present in the vessel may be retained for use in a subsequent pressure fixation cycle. Preferably, the aromatized glyceride phase and any water phase which may be present in the vessel are separated during removal from the vessel. Alternatively, since water will be the heaviest material within the vessel, it would be possible to remove the bottom liquid water phase from the vessel at any point in the pressure fixation cycle.

Removing water from the aromatized glyceride, preferably down to a level of 0.5% by weight or less, appears to further stabilize the grinder gas aromatics. As disclosed in the aforementioned application Ser. No. 252,883, centrifugation, ultra-centrifugation, molecular fractionation, drying agents and like method have proven to be successful techniques for removing water from the aromatized glyceride. As a further refinement of this water removal process, it is possible to separate any aromas from the removed water such as by vacuum distillation and to add these separated aromatics back to the aromatized glyceride.

The aromatized glyceride may be combined with soluble coffee powder or with coffee extract prior to drying the extract in accordance with any of the known prior art techniques or as disclosed in any of the previously enumerated copending, commonly-assigned patent applications. Typical levels of addition for the aromatized glyceride are 0.1 to 2% by weight glyceride based on the weight of soluble solids in the final product. The aromatized powder of this invention may constitute all or only a portion of the powder in the final product, as will be apparent to those skilled in the art.

The term coffee powder and coffee extract used in the description of this invention is meant to include materials containing in whole or in part coffee substitutes such as powders or extracts obtained in whole or in part from roasted cereals such as wheat, rye, barley and the like. One such item is the water extract and resulting dried powder of wheat, barley and molasses known as "Instant Postum."

This invention is further described but not limited by the following example:

EXAMPLE (222-36)

A mixture of 130 grams of liquid nitrogen-condensed grinder gas frost and 110 grams of coffee oil were put in a high pressure stainless steel bomb and warmed up to 80°F. A pressure of 700 psig. was obtained. The pressure was released and the residue that remained was stored at 0°F for fourteen days and then plated onto the surface of soluble coffee powder at a level of 0.5%.

I claim:

1. A method for aromatizing soluble coffee comprising the steps of:
    a. condensing, as a frost, an aroma-containing gas which has a high carbon dioxide content,
    b. placing the aroma-containing frost in a pressure vessel,
    c. placing liquid glyceride in the vessel at a level of one gram of glyceride to 0.5 to 6 grams of aroma frost, isolating the pressure vessel and increasing the temperature within the vessel to a temperature of about 70°–75°F such that the pressure within the vessel increases to above 100 psia and a liquid $CO_2$ phase which contains aroma is formed,
    d. removing the glyceride from the vessel and combining it with coffee solids.

2. The method of claim 1 wherein the aromatized glyceride is added to soluble coffee powder.

3. The method of claim 1 wherein the aroma-bearing gas is obtained by disrupting the cellular structure of freshly roasted coffee beans.

* * * * *

UNITED STATES PATENT AND TRADEMARK OFFICE
CERTIFICATE OF CORRECTION

PATENT NO. : 3,979,528
DATED : September 7, 1976
INVENTOR(S) : James P. Mahlmann It is certified that error appears in the above-identified patent and that said Letters Patent are hereby corrected as shown below:

Claim 1, cancel lines 7 to 15, and insert the following:

c) placing a liquid glyceride within said pressure vessel, said glyceride being present in the pressure vessel at a level of about one gram of glyceride to 0.5 to 6 grams of aroma frost, d) isolating the pressure vessel and thereafter raising the temperature and pressure within the vessel to about 70°F-75°F and above 100 psia., respectively, thereby forming an aroma-containing liquid $CO_2$ phase, e) maintaining contact between said liquid $CO_2$ phase and the liquid glyceride in order for aromatics to disssolve in the glyceride, f) removing the aroma-containing glyceride from the vessel and combining it with coffee solids.

Signed and Sealed this

Twelfth Day of April 1977

[SEAL]

Attest:

RUTH C. MASON
*Attesting Officer*

C. MARSHALL DANN
*Commissioner of Patents and Trademarks*